United States Patent
Ahmed et al.

(10) Patent No.: US 9,374,698 B2
(45) Date of Patent: Jun. 21, 2016

(54) PERSONALIZED EMERGENCY IDENTIFICATION AND COMMUNICATION

(71) Applicant: Verizon Patent and Licensing Inc., Arlington, VA (US)

(72) Inventors: Walid K. M. Ahmed, Tinton Falls, NJ (US); Michael Adamo, Wayne, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 5 days.

(21) Appl. No.: 14/466,817

(22) Filed: Aug. 22, 2014

(65) Prior Publication Data

US 2016/0057595 A1    Feb. 25, 2016

(51) Int. Cl.
*H04M 11/04* (2006.01)
*H04W 4/22* (2009.01)
*H04W 4/02* (2009.01)

(52) U.S. Cl.
CPC . *H04W 4/22* (2013.01); *H04W 4/02* (2013.01)

(58) Field of Classification Search
CPC .................................. H04W 4/22; H04W 4/02
USPC ................. 455/404.1, 404.2, 456.1, 456.3
See application file for complete search history.

(56) References Cited

U.S. PATENT DOCUMENTS

| | | | | |
|---|---|---|---|---|
| 2005/0070315 A1* | 3/2005 | Rai | ...................... | H04W 76/007 455/466 |
| 2005/0153681 A1* | 7/2005 | Hanson | ................. | G08B 25/016 455/404.2 |
| 2006/0252998 A1* | 11/2006 | Kimbrell | ........... | H04M 1/72536 600/300 |
| 2008/0284587 A1* | 11/2008 | Saigh | ................ | H04M 1/72541 340/539.13 |
| 2009/0076345 A1* | 3/2009 | Manicka | .............. | A61B 5/4875 600/301 |
| 2009/0296898 A1* | 12/2009 | Ragno | .................... | G06Q 10/06 379/45 |
| 2011/0009087 A1* | 1/2011 | Best | ................... | H04M 1/72536 455/404.1 |
| 2011/0319051 A1* | 12/2011 | Reitnour | ................. | G01S 19/17 455/404.2 |
| 2012/0115430 A1* | 5/2012 | Hawkes | ............ | H04M 1/72536 455/404.1 |
| 2012/0225633 A1* | 9/2012 | Nichols | .............. | G08B 13/1427 455/404.1 |
| 2012/0258684 A1* | 10/2012 | Franz | ...................... | H04W 4/14 455/404.2 |
| 2014/0024333 A1* | 1/2014 | Stadtlander | ............. | H04W 4/22 455/404.2 |
| 2014/0176327 A1* | 6/2014 | Parada | ................... | A42B 3/046 340/539.12 |
| 2014/0177812 A1* | 6/2014 | Barrett | .................. | H04M 11/04 379/47 |
| 2014/0218537 A1* | 8/2014 | Nepo | .................. | G08B 15/004 348/158 |
| 2014/0273912 A1* | 9/2014 | Peh | ........................ | H04W 4/22 455/404.1 |
| 2014/0365390 A1* | 12/2014 | Braun | .................. | G06Q 50/265 705/325 |

* cited by examiner

*Primary Examiner* — Mong-Thuy Tran

(57) ABSTRACT

An individual uses a communication device to provide information identifying the type of emergency that the individual is experiencing. In response to receiving an emergency alert, an inquiry as to whether the received emergency alert relates to a medical emergency or to a non-medical emergency is generated and provided to the user. Upon receiving a response indicating that the emergency alert relates to a medical emergency, a medical history of the individual is automatically retrieved and a geographical location of the user is determined. A medical emergency service that is suitable for determining a type of medical assistance required by the individual is automatically identified based on the received confirmation and the retrieved medical history. A bi-directional communication with a communication device of the identified medical emergency service is established to upload to a data storage element of the communication device the medical history and geographical location of the individual.

18 Claims, 12 Drawing Sheets

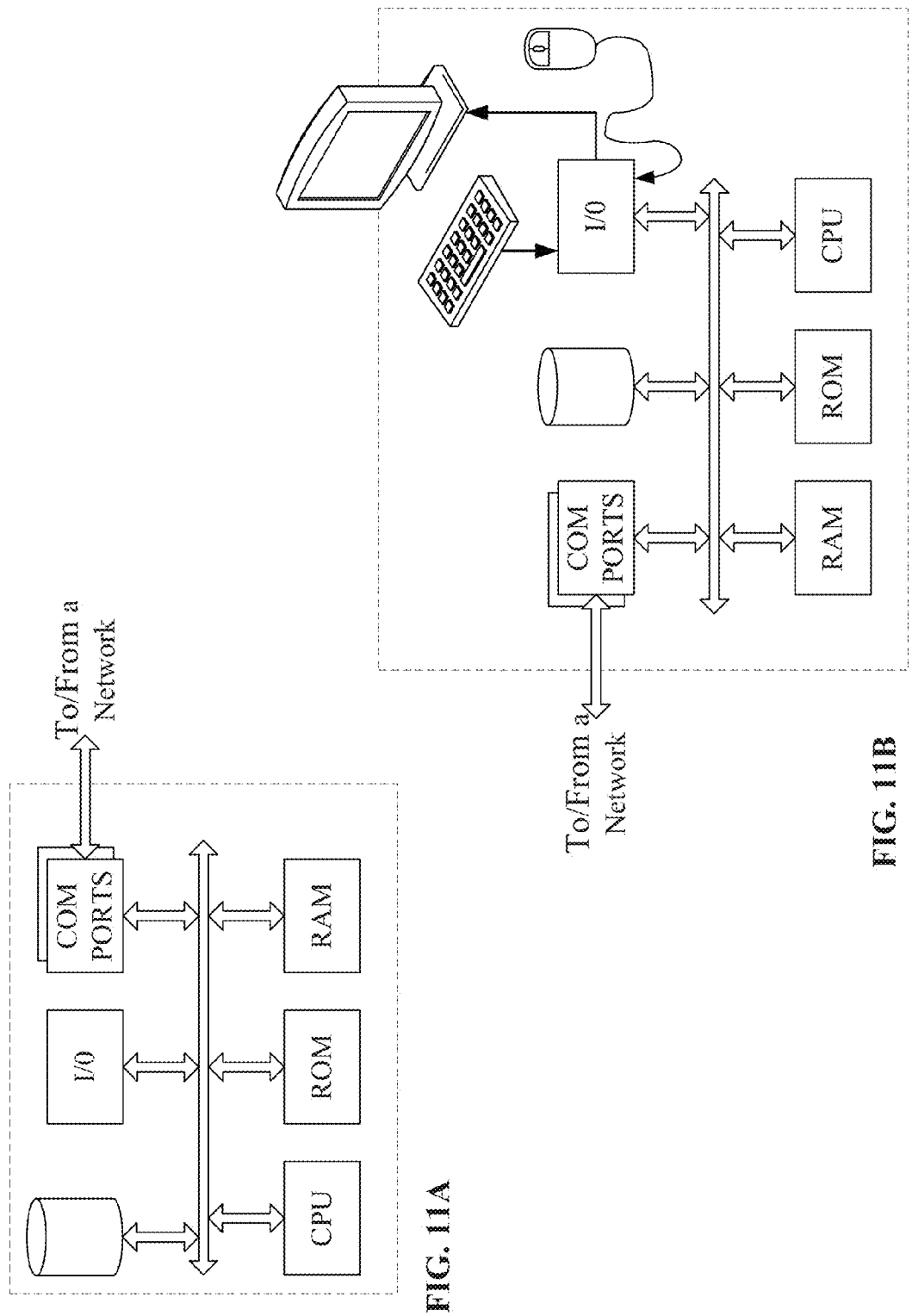

PERSONALIZED EMERGENCY IDENTIFICATION AND COMMUNICATION

BACKGROUND

Unless otherwise indicated herein, the materials described in this section are not prior art to the claims in the present application and are not admitted to be prior art by inclusion in this section.

Around the world, emergency services have one or more dedicated emergency telephone numbers reserved for critical emergency calls. The United States has structured a "9-1-1" emergency system for the safety of its citizens. The 9-1-1 emergency system was created to report incidents that are emergency-type situations by using telephones, either wired or wireless. As such, a person, who may be in distress, can place a call to the emergency telephone number 9-1-1 to report an emergency situation, such as an accident, illness, assault, etc.

The 9-1-1 call links the caller to a public emergency dispatch center, also referred to as a public safety answering point (PSAP) by the telecommunication industry, in the vicinity of the caller. At the PSAP, a trained emergency dispatcher can assess the nature of the emergency based on information provided by the caller, in order to determine what kind of assistance to offer, which emergency services or law enforcement personnel to summon to the source of the call, or what other services to provide.

As stated, a 9-1-1 call requires that the caller provides information in person during the phone call to enable the trained emergency dispatcher to determine whether the caller is subject to an emergency. Hence, a need exits for a method and apparatus that allow a person to provide an emergency dispatcher, with or without a live discussion, information identifying the type of emergency that the person is experiencing.

BRIEF DESCRIPTION OF THE DRAWINGS

The drawing figures depict one or more implementations in accord with the present teachings, by way of example only, not by way of limitation. In the figures, like reference numerals refer to the same or similar elements;

FIG. 11A is a simplified functional block diagram of a computer that may be configured as a host or server, for example, to function as the data provider in the system of FIG. 1;

FIG. 11B is a simplified functional block diagram of a personal computer or other work station or terminal device.

DETAILED DESCRIPTION OF THE DRAWINGS

Figure 1:
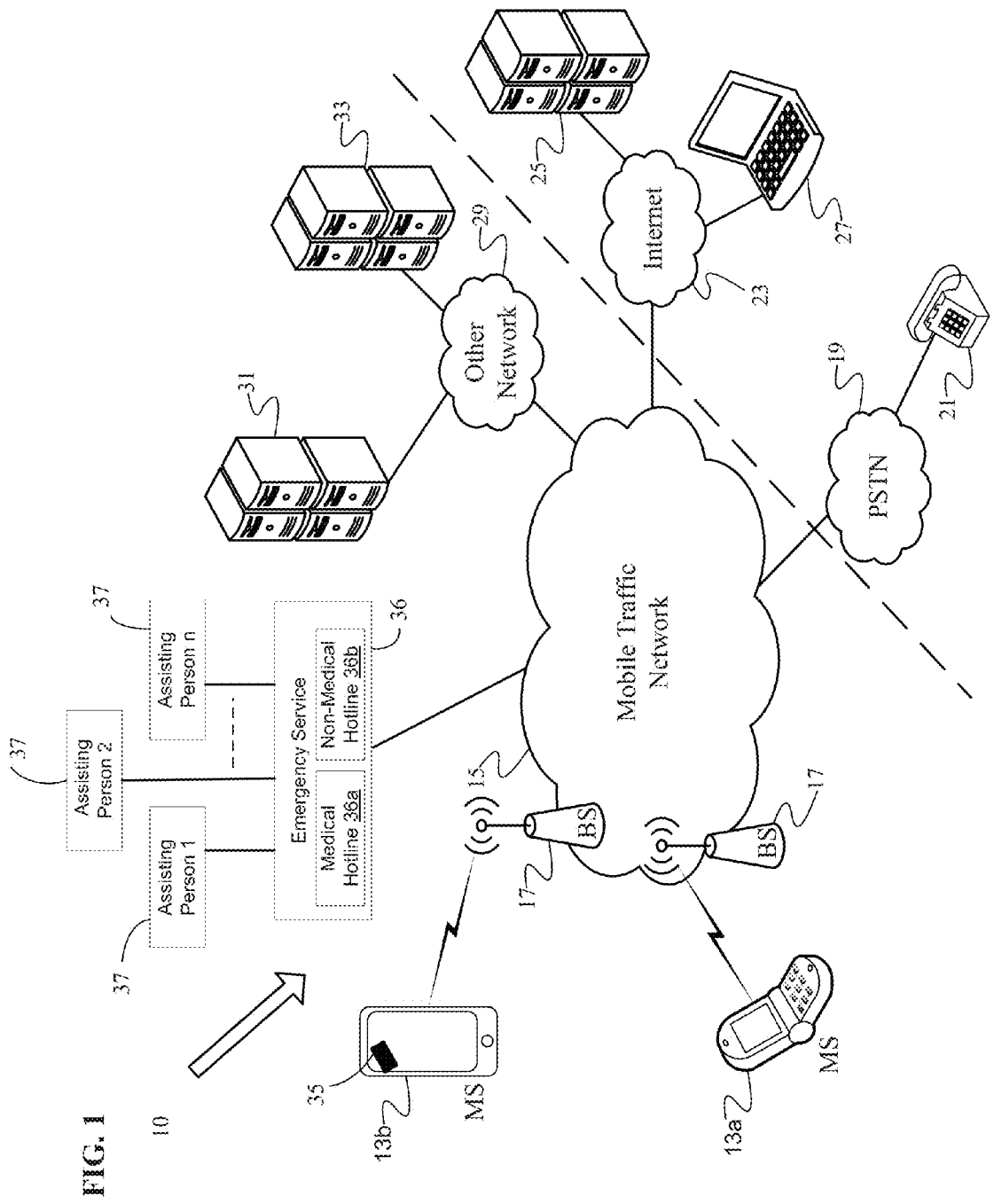
FIG. 1 illustrates a high-level functional block diagram of an exemplary system of networks/devices that provide various communications for mobile stations to support personalized emergency identification and communication.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to an emergency identification and alert process and system for notifying authorities while simultaneously sharing health status information, such as current biometrics, and personal data of a user upon any urgent medical or non-medical event. As known, biometrics relate to human characteristics and traits. Personal data may include health records, allergy information, current prescriptions, and emergency contacts.

As stated above, an emergency call to the telephone number 9-1-1 requires that a caller provides information in person during the phone call to enable a trained emergency dispatcher to determine whether the caller is subject to a medical emergency or a non-medical emergency. However, when an individual is in a serious accident, a criminal event, or a health emergency, the individual may not possess the physical and/or mental abilities to use his/her voice to initiate a dialing of an emergency phone number or a voice activation of an emergency application, and to handle a live phone call on his/her current computing device, such as mobile device. During a heart attack, for example, an individual may not have the physical strength required to dial telephone number 9-1-1 and to talk for at least a short period of time to an emergency dispatcher in order to provide necessary information about his/her health status. During a criminal/life threatening situation, for example, an individual may have to remain silent while his/her offenders are within a hearing range. In addition, an individual in a particular emergency situation may have to make a choice at a critical moment between calling an emergency dispatcher, a primary physician, or one of his/her family members and friends.

An "emergency call," as the term is used herein, is to be broadly interpreted to include any suitable transmission of a signal message to an emergency number. Emergency calls can include, for example, analog, digital, and wireless transmissions that are subject to any known signal processing. An emergency call can include voice, text, image, video, etc., in any format. As stated above, an emergency number, as the term is used herein, is to be broadly interpreted to include the numeric string 9-1-1. However, in accordance with principles of the present disclosure, computing devices can communicate with any known or existing "9-1-1 emergency service" using any suitable universalized dialing sequence or code. In addition to mobile devices, the computing devices may include phablets, tablets, wearable computing devices, and any other wireless computing devices, as well as wired computing devices.

In accordance with the present disclosure, an emergency application loaded on a computing device is configured to ask the user whether his/her current health status corresponds to a medical emergency. To this end, the emergency application may be configured to be launched by the user manually in one of a variety of ways, vocally, or automatically when monitored wellness credentials of the user reach dangerous levels, for example. As known to one of ordinary skill in the art, wellness or health credentials are measurable indicators of a health status of an individual, such as for example a blood pressure level, a heart rate, a body temperature, and a sugar level. Upon being launched, the emergency application may display a user interface on a display screen of the computing device asking the user whether his/her current health status corresponds to a medical emergency. Alternatively or additionally, instead of displaying the question on the user interface, the computing device may announce the question through a speaker component of the computing device. If the user responds, manually or vocally, with a "Yes" reply, the application is configured to automatically dial an emergency telephone number, such as "9-1-1," and then upload the user's location and any necessary health-related data to a database associated with the emergency telephone number. Otherwise, if the user responds, manually or vocally, with a "No" reply, the application is configured to just dial the emergency telephone number, as a normal non-medical emergency call. Moreover, if the user does not respond within a preset time (perhaps with a confirmation and audible/visual reminder), the application is configured to assume that the user is subject to an emergency.

As stated above, the emergency application may be launched by the user in a variety of ways, including but not limited to, directly dialing the official emergency telephone number, manually pressing a physical button or touching/clicking on a soft key a predetermined number of times within a predetermined time period, manually pressing or touching a predetermined button or soft key sequence, or a combination of hard buttons and soft keys sequence, performing a touch screen swiping pattern, performing a waving or shaking pattern of the computing device, and stating a voice command input, such as "Dial 9-1-1" for example.

In accordance with the present disclosure, the computing device is equipped with or is coupled to body monitoring sensors, such as a blood pressure sensor, a heart rate sensor, a body temperature sensor, and a sugar level sensor, and to physical activity sensors, such as an accelerometer.

In accordance with the present disclosure, upon receiving an alert notification, a monitoring agency is able to determine whether the user is subject to a medical or non-medical emergency, based on information provided in the alert notification. Moreover, during an emergency alert, the monitoring agency receives the user's historical data along with the user's current location to share with a medical emergency assisting person, such as an emergency medical technician (EMT) for a timely and more accurate health assessment.

Accordingly, the above-discussed procedure relates to identifying personalized emergencies and triggering and handling emergency communications with predetermined emergency contacts from a computing device. Reference now is made in detail to the examples illustrated in the accompanying drawings and discussed below.

FIG. 1 illustrates a system 10 offering a variety of mobile communication services to support personalized emergency identification and communication. The example shows simply two mobile stations (MSs) 13a and 13b as well as a mobile communication network 15. The mobile stations 13a and 13b are examples of mobile stations that may be used for alerting the user of sensed wellness credentials and notifying emergency contacts, such as monitoring agencies or authorities, while simultaneously sharing the user's health status and personal data.

The network 15 provides mobile wireless communications services to stations 13a and 13b as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13a and 13b may be capable of voice and data communications through the network 15.

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13a and 13b via the Internet 23 may be with devices like those shown at 25 and 27 as well as with a variety of other types of devices or systems capable of data communications through various interconnected networks.

Mobile stations 13a and 13b can take the form of portable handsets, smart-phones or personal digital assistants, although they may be implemented in other form factors. Program applications, including an application to assist in the identification of personalized emergencies and triggering and handling emergency communications with predetermined emergency contacts can be configured to execute on many different types of mobile stations 13a and 13b. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13a and 13b, can include one or more RANs and a regional circuit and/or packet switched network and associated signaling network facilities.

Physical elements of a RAN, operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations 13 communicate. The network 15 can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

A mobile station 13a or 13b communicates over the air with a base station 17 and through the traffic network 15 for various voice and data communications, e.g. through the Internet 23 with a server 25 and/or with application servers 31. The mobile service carrier may offer an emergency identification and notification application (hereafter referred to as an emergency application 35). Once downloaded to a mobile device, the emergency application 35 may be configured to identify personalized health status of the user when launched by the user or when monitored wellness credentials of the user reach dangerous levels by capturing data from body monitoring sensors. Upon identifying the personalized health status of the user, the emergency application 35 may be configured to notify emergency contacts, while simultaneously sharing with them the user's health status, personal data upon any urgent medical or non-medical event, and his/her current location. In accordance with the present disclosure, an urgent medical event is determined by the emergency application 35 when one or more monitored wellness credentials of the user reach dangerous levels.

The emergency application 35 may be hosted on a carrier operated application server 31, as shown in FIG. 1, for communication via the networks 15 and 29. Alternatively, the emergency application 35 may be provided by a separate entity (alone or through agreements with the carrier), in which case, the emergency application 35 may be hosted on an application server such as server 25 connected for communication via the networks 15 and 23. In yet another alternative, the emergency application 35 may be hosted on a mobile station 13a or 13b. Server such as 25 and 31 may provide any of a variety of common application or service functions in support of or in addition to an application program running on the mobile station 13. However, for purposes of further discussion, we will focus on functions thereof in support of the emergency application 35.

To insure that the emergency application 35 offered by server 31 is available to only authorized devices/users, the provider of the emergency application 35 also deploys an authentication server 33. The authentication server 33 could be a separate physical server as shown, or authentication server 33 could be implemented as another program module running on the same hardware platform as the server application 31. Essentially, when the server application (server 31 in our example) receives an application request from a client device on a mobile station 13, the server application provides appropriate information to the authentication server 33 to allow server application 33 to authenticate the mobile station 13 as outlined herein. Upon successful authentication, the server 33 informs the server application 31, which in turn provides access to the emergency application 35 through the various communication elements (e.g. 29, 15 and 17) of the network 10.

The emergency application 35 under consideration here may be delivered to touch screen type mobile stations. Alternatively or additionally, the emergency application 35 under consideration may be delivered to non-touch type mobile stations. Hence, our simple example shows the mobile station 13a as a non-touch type mobile station and the mobile station 13b as a touch screen type mobile station.

In addition, FIG. 1 includes an emergency service 36 that is operatively connected to network 15 and that includes a medical hotline service 36a and a non-medical hotline service 36b. Moreover, the emergency service 36 is operatively connected to a plurality of emergency assisting persons 37. The medical hotline service 36a is designated to receive and handle medical emergency calls, and the non-medical hotline service 36b is designated to receive and handle non-medical emergency calls. Emergency assisting persons 37 are experienced individuals who can render assistance to persons experiencing medical emergencies.

Figure 2:
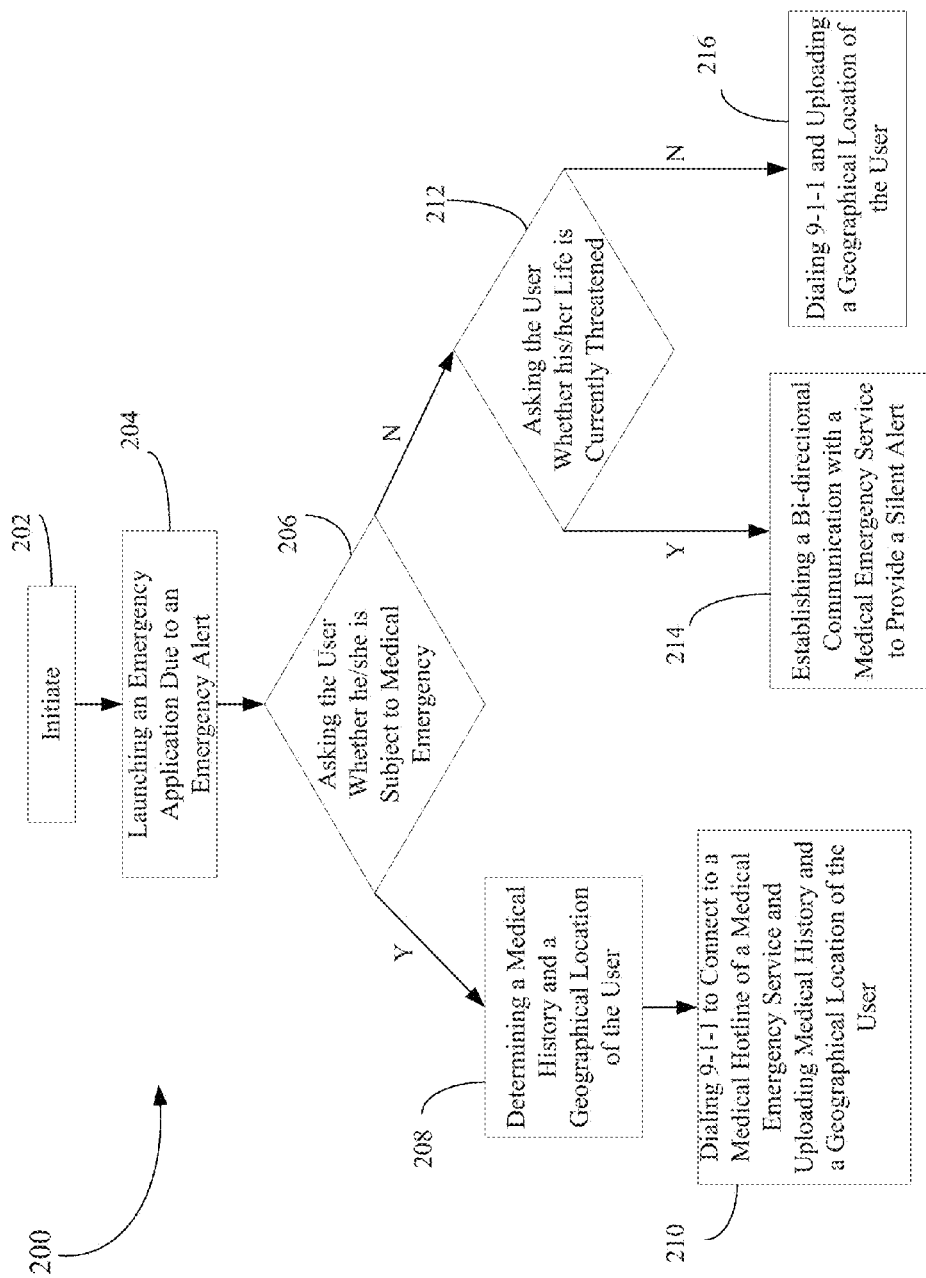
FIG. 2 illustrates an exemplary process for handling an emergency call triggered by a user who may be subject to a non-medical or medical emergency situation.
Figure 3:
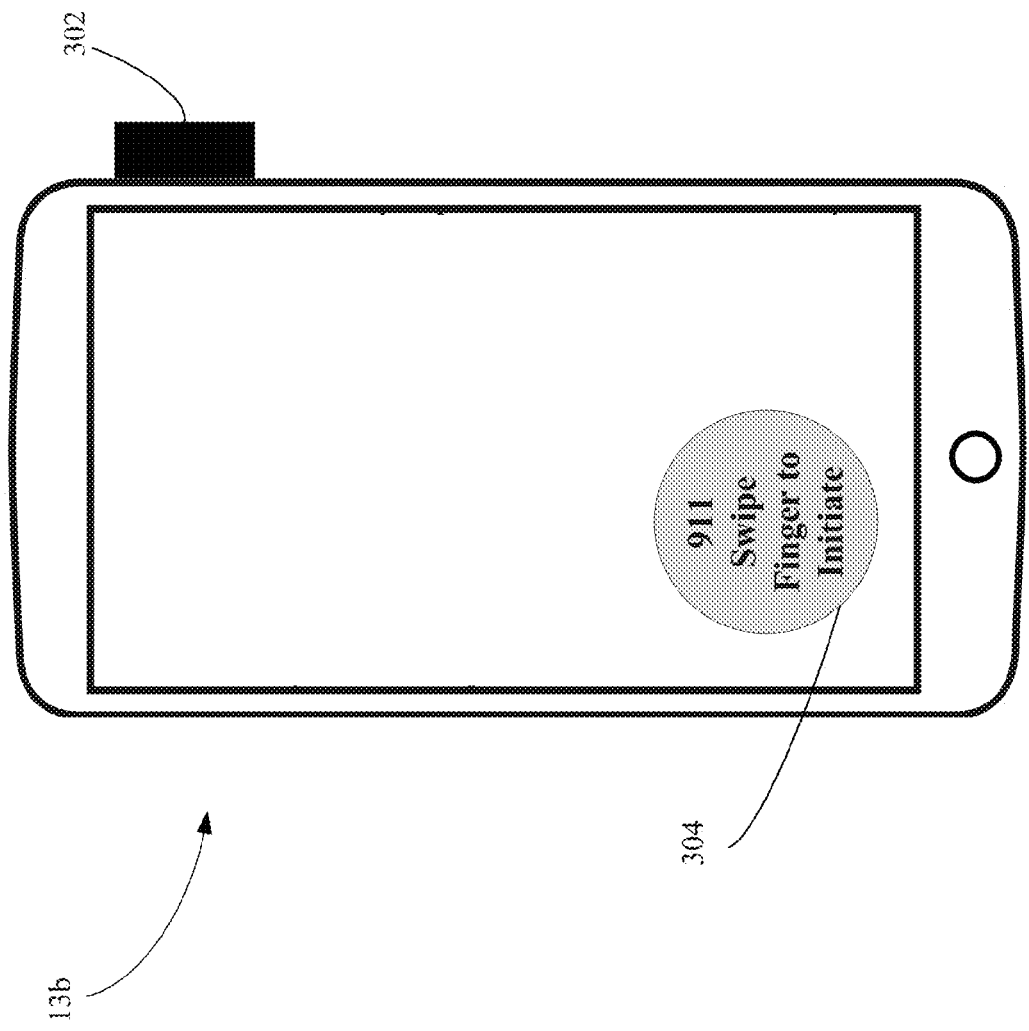
FIG. 3 illustrates an exemplary mobile device having an emergency icon displayed on a display screen and an emergency button located near a lower end of the left side of the mobile device.
Figure 7:
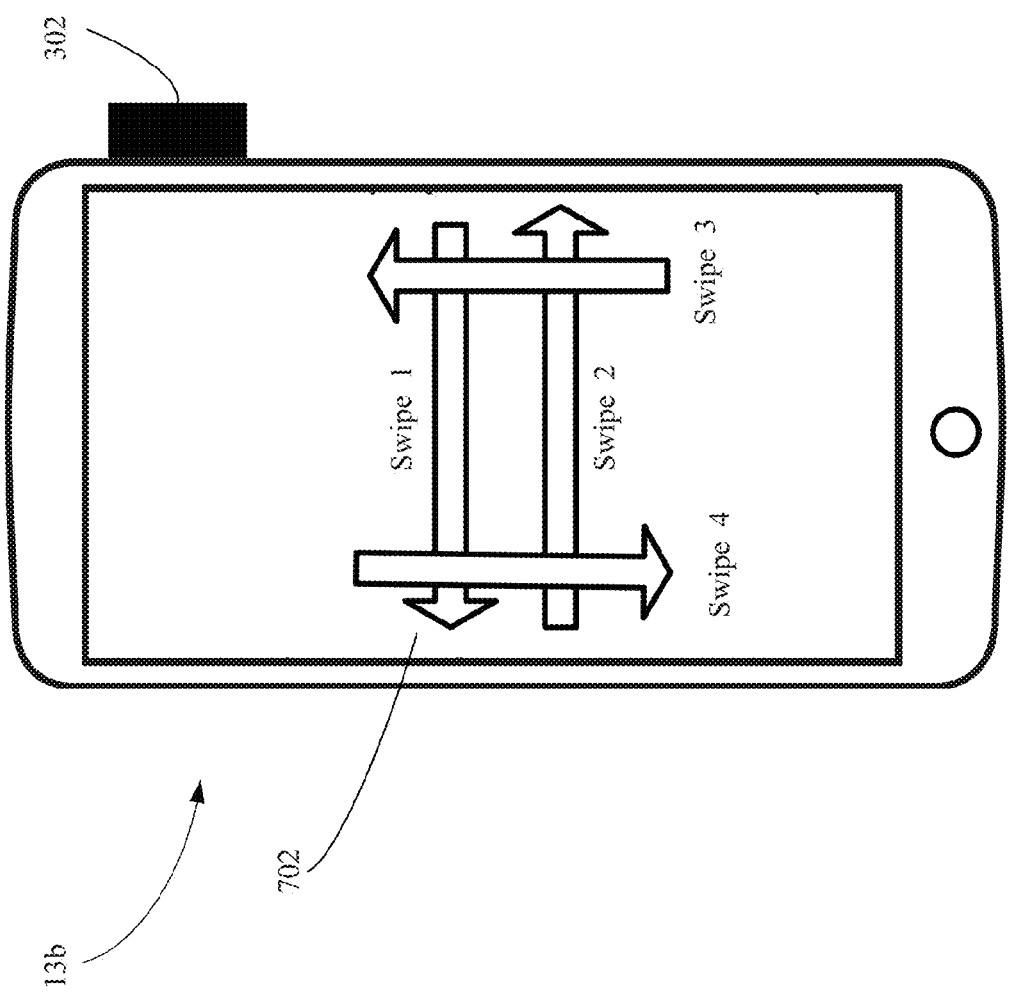
FIG. 7 illustrates an exemplary screen of the mobile device of FIG. 3 having a display of a swiping pattern for use as a silent alarm dial.

FIG. 2 illustrates an exemplary process/method 200 for handling an emergency call triggered by a user who may be subject to a non-medical or medical emergency situation. The process 200 may be initiated by a user who is seeking assistance for a non-medical or medical emergency situation, at Step 202. When the user wishes to trigger an emergency call to contact a public emergency dispatch center, at Step 204, as discussed above, he/she can launch the emergency application 35. The emergency application 35 may be launched by the user in variety of ways. To illustrate a few examples, the emergency application 35 may be launched via a voice command input, by directly dialing the official emergency telephone number using a physical keyboard or a virtual keyboard, by manually pressing a physical non-keyboard button 302 shown in FIG. 3, selecting a soft key 304 (via touching/clicking/swiping a finger on the soft key 304) displayed on a touch screen of mobile station 13b a predetermined number of times within a predetermined time period, manually selecting a predetermined keyboard button or soft key sequence, or a combination of hard buttons and soft keys sequence, performing a touch screen swiping pattern, such as the swiping pattern 704 shown in FIG. 7, performing a waving or shaking pattern of the computing device, and stating a voice command input, such as "Dial 9-1-1" for example.

Once the emergency application 35 is launched, a processor of the computing device is configured to display a user interface on the display screen of the computing device, at Step 206, which includes a question for the user asking him/her whether he/she is subject to a medical emergency. In one implementation, the question is not delivered audibly by the processor to minimize endangering the user in case his/her life is currently threatened as discussed hereafter.

If the user responds, manually or vocally, affirmatively in that his/her current situation involves a medical emergency, the processor is configured to determine a geographical location of the user, and to collect his/her medical history, at Step 208. The user's medical history may be stored in the computing device or in a network server. In one implementation, the user's medical history is updated by the storing of medical data provided by the user's medical doctor following each doctor visit, and by the storing of data provided by the body monitoring sensors when one or more wellness credentials reach dangerous levels. The server may allow access to the medical history information of the user by the computing device based on the user's credentials provided by the computing device. As known to one of ordinary skill in the art, some mobile devices include a global positioning system (GPS) receiver, and a GPS system uses a constellation of satellites in low earth orbit to transmit signals usable by a suitable receiver to determine its geographical location with a precision of a few yards or less. Alternatively, other means of location detection, such as triangulation or based on access point (e.g., localized WiFi access point), may be used.

Once the information about the geographical location and medical history of the user is acquired, the processor is configured to dial a predetermined emergency number that links the computing device to a medical hotline and uploads to a medical emergency database associated with the predetermined emergency number the acquired geographical and medical information, at Step 210. Alternatively, the user may send a text or an email to the emergency center to inform them of his/her current health status and geographical location.

If the user responds, manually or vocally, negatively in that his/her current situation involves a non-medical emergency, the processor is configured to display another user interface on the display screen of the computing device, at Step 212, which includes a question for the user asking him/her whether his/her life is currently being threatened. If the user responds, manually or vocally, affirmatively in that his/her life is currently being threatened, the processor is configured to dial the predetermined emergency number to establish a unidirectional or bi-directional communication to provide an operator of the emergency service a silent alert and the geographical location of the user, at Step 214. The silent alert can be provided to the operator via a text message or via a pre-recorded voice message on the computing device. Alternatively, the silent alert can be provided through an open channel to the emergency service.

In accordance with present disclosure, the silent alert serves to inform the operator that the user of the computing device is currently subject to a life threatening situation, and that the operator should keep the connection with the computing device to be able to secretly listen to any on-going or near-future conversation conducted by an offender with the user or around the user so as to assess the situation and proceed with a suitable action that would provide assistance to the user. The suitable action may involve identifying one or more potential assisting persons that are in position to render assistance to the user. The potential assisting persons, such as for example family members, neighbors, and police officers, may be identified based at least in part on their respective geographical proximity to the user, for example based on their respective interaction with the same cell of a cellular communications network. Once identified, an electronic message can be sent to one or more potential assisting persons indicating that the user has requested assistance. The electronic message may contain necessary information about the user to assist the one or more potential assisting persons. In this way, the user may be assisted in a desirable and quick manner.

Figure 4:
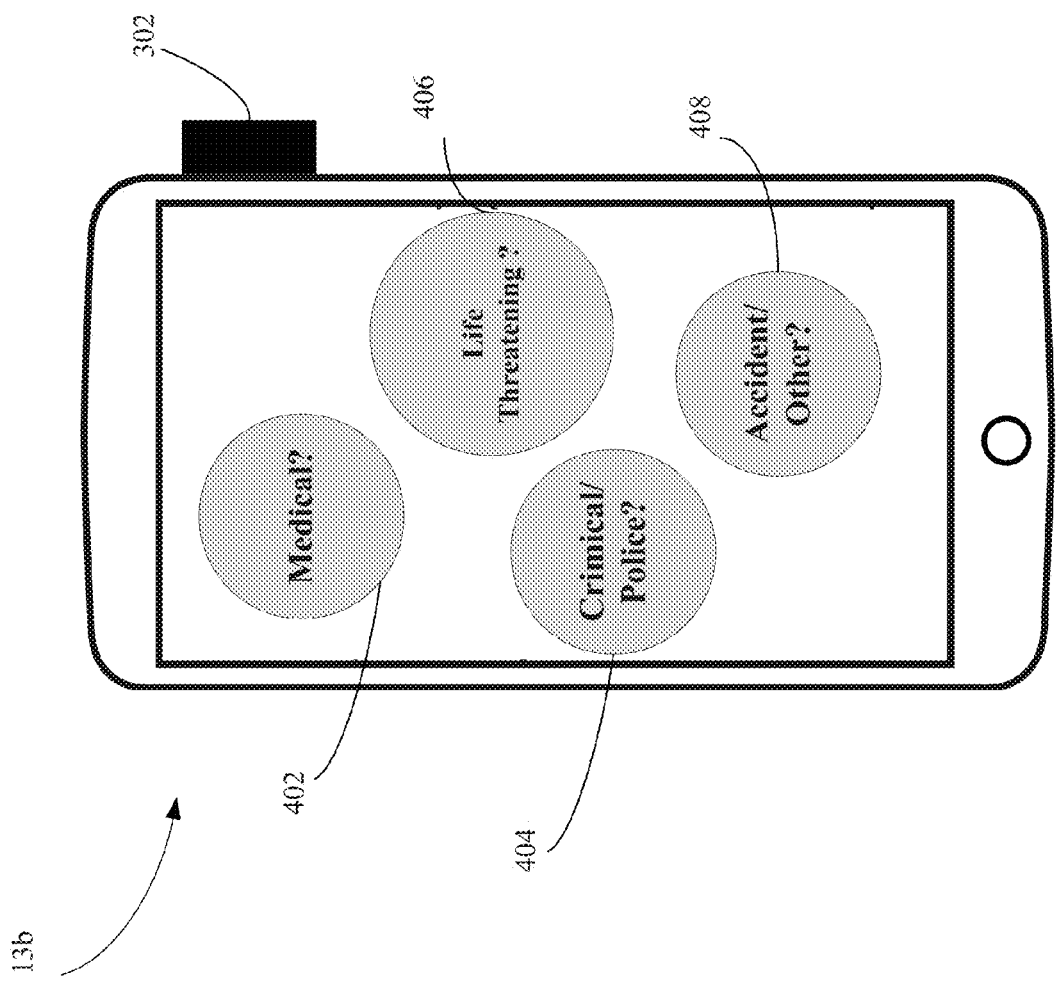
FIG. 4 illustrates an exemplary screen of the mobile device of FIG. 3 having a plurality of icons generated and displayed on a display screen by an emergency application.

If the user responds, manually or vocally, negatively in that his/her life is not currently being threatened, the processor is configured to dial the predetermined emergency number and send a geographical location of the user, at Step 216. In one embodiment, once the emergency application 35 is launched, the user is presented with the screen shown in FIG. 4 to choose the type of emergency the user is in. The user can select from Medical 402, Criminal/Police 404, Life Threatening 406 and Accident/Other 408 to indicate his/her emergency.

Figure 8:
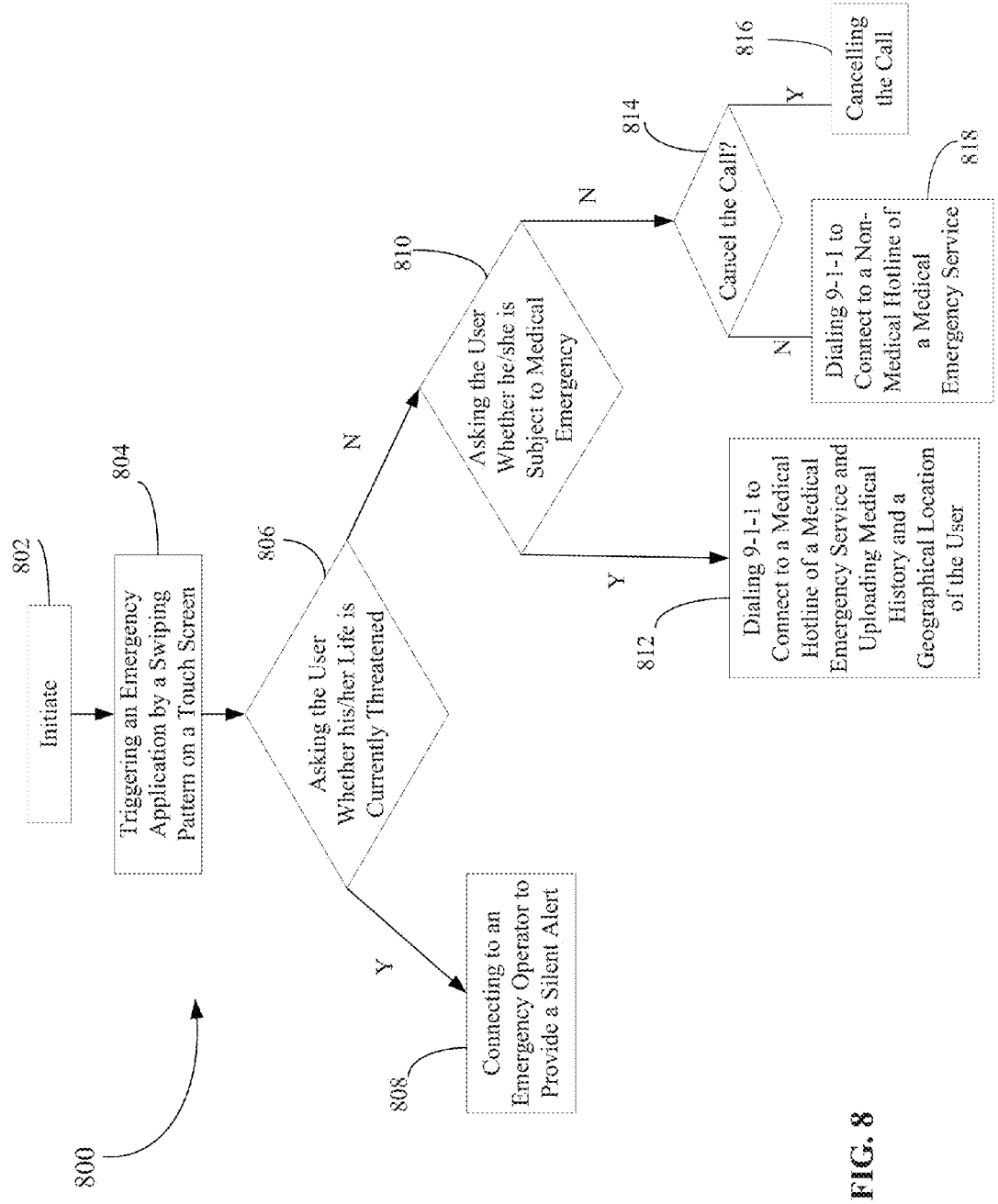
FIG. 8 illustrates an exemplary process for handling an emergency call triggered by a user who may be subject to a life threatening situation.

FIG. 8 is illustrates an exemplary implementation of a process 800 for handling an emergency call triggered by a user who may be subject to a life threatening situation. The process 800 begins by the user who is seeking assistance for a criminal/life threatening situation, at Step 802. To seek assistance during a criminal/life threatening emergency, the user may need to decide how to trigger the emergency application 35 to help him/her establish a contact with the emergency service, at Step 804. Based on his/her evaluation of the current environment, the user may opt to launch the emergency application 35 in a silent manner by performing a predetermined touching pattern on the touch screen of the computing device, such as the swiping pattern 702 shown in FIG. 7, which includes a hash (#) pattern, by selecting a soft key a predetermined number of times during a predetermined time period, such as three times within five seconds, or by selecting a set of soft keys in a predetermined sequence. Alternatively, the user may opt to trigger the emergency application 35 by performing a shaking pattern or a flipping pattern of the computing device. In one implementation, the touching pattern may be preset by the user using instructions provided by the emergency application 35. The shaking pattern may include a horizontal and/or vertical shaking action of the computing device. The flipping pattern may include a flipping action along a width direction and/or a length direction of the computing device. The shaking and flipping action may be captured by an accelerometer and a gyroscope, which are integral to the computing device.

In case, the user believes that the process of launching the emergency application 35 does not need to be silent, he/she may proceed with a selection of a hard button a predetermined number of times during a predetermined time period, by selecting a set of hard buttons in a predetermined sequence, or by selecting a combination of hard button and soft keys in another predetermined sequence. Alternatively, the user may trigger the launching of the emergency application 35 by pronouncing a predetermined word, such as "safe" and "pass," or a predetermined sentence, such as "please do not hurt me."

Once the emergency application 35 is launched, a processor associated with the computing device is configured to display a user interface on the display screen of the computing device, at Step 806, which includes a question for the user asking him/her whether his/her life is currently being threatened. In one implementation, the question is not delivered audibly by the processor to minimize endangering the user in case his/her life is currently threatened as discussed hereafter. If the user responds, manually or vocally, affirmatively in that his/her life is currently being threatened, the processor is configured to dial the predetermined emergency number that would connect it to an operator of the emergency service to provide a silent alert and the geographical location of the user, at Step 808. Alternatively, in one implementation, if the user does not respond to avoid alerting a criminal, the processor is configured to trigger a countdown and proceed after the countdown ends with the dialing of the predetermined emergency number that would connect it to an operator of the emergency service to provide a silent alert and the geographical location of the user.

If the user responds, manually or vocally, negatively in that his/her life is not currently being threatened, the processor is configured to display another user interface on the display screen of the computing device, at Step 810, which includes a question for the user asking him/her whether he/she is subject to a medical emergency. If the user responds, manually or vocally, affirmatively in that his/her current situation involves a medical emergency, as stated above, the processor is configured to determine a geographical location of the user and to collect his/her medical history, which may be stored in the computing device or in a network server that allows access of the user medical history by the computing device based on its credentials. As stated above, once the information about the geographical location and medical history of the user is acquired, the processor is configured to dial a predetermined emergency number that would link it to a medical hotline and upload the acquired geographical and medical information, at Step 812.

If the user responds, manually or vocally, negatively in that his/her current situation involves a non-medical emergency, the processor is configured to display another user interface on the display screen of the computing device, at Step 814, which includes another question for the user asking him/her whether he/she would like to cancel the call. If the user responds, manually or vocally, affirmatively in that he/she agrees to cancel the emergency call, the processor is configured to cancel the emergency call, at Step 816. Otherwise, if the user responds, manually or vocally, negatively in that he/she does want to cancel the emergency call, the processor is configured to proceed with the dialing of an alternate emergency number that would connect the computing device to a non-medical hotline, at Step 818.

Figure 9:
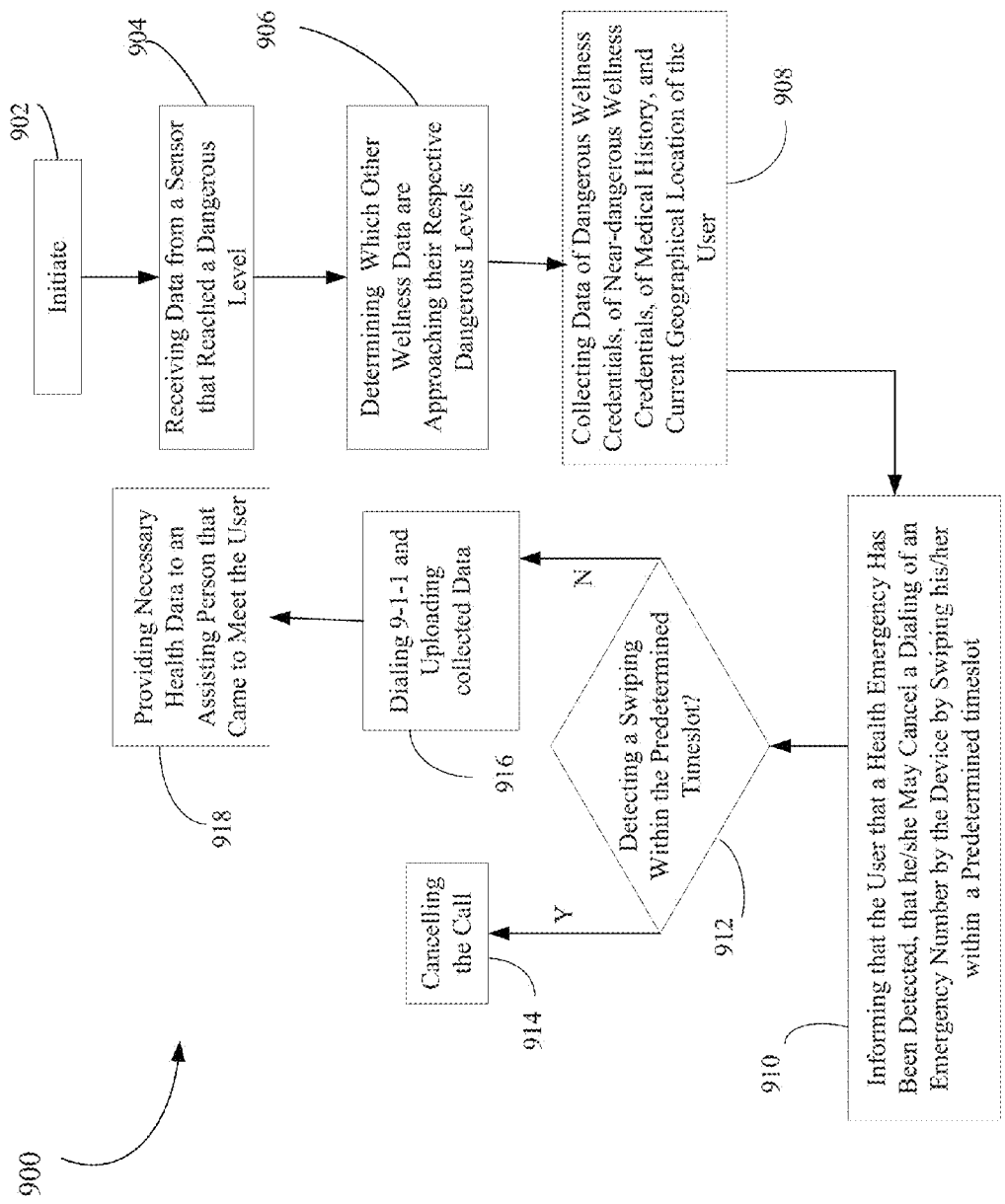
FIG. 9 illustrates an exemplary process for handling an emergency call when a controller of a computing device receives wellness data about a user from a sensor, which has reached a threshold value.

FIG. 9 is a flow chart of an exemplary implementation of a process 900 for handling an emergency call when a controller of a computing device receives wellness data about a user from a body monitoring sensor, which has reached an undesirable threshold value, e.g., a dangerous level. The process 900 is automatically triggered by an emergency application 35 when monitored wellness credentials start approaching their respective threshold values, at Step 902. As stated above, body monitoring sensors, which may communicate with at least one controller of the computing device, include a blood pressure sensor, a heart rate sensor, a body temperature sensor, and a sugar level sensor.

Upon receipt of wellness data by the controller that have reached a dangerous level for the user from one of the monitoring sensors, at Step 904, the processor is configured to determine which other wellness credentials may have current wellness data that may be getting closer to their respective dangerous levels, at Step 906. This may be because when one or more additional wellness credentials are approaching their respective dangerous levels, it may be an indication that the user may be subject to a health issue that is worse than the one corresponding to the wellness credential whose data has already reached its dangerous level. Subsequently, the processor is configured to collect data corresponding to the wellness credentials that have reached or are approaching their respective dangerous levels, a medical history of the user, and his/her current geographical location, at Step 908.

Figure 5:
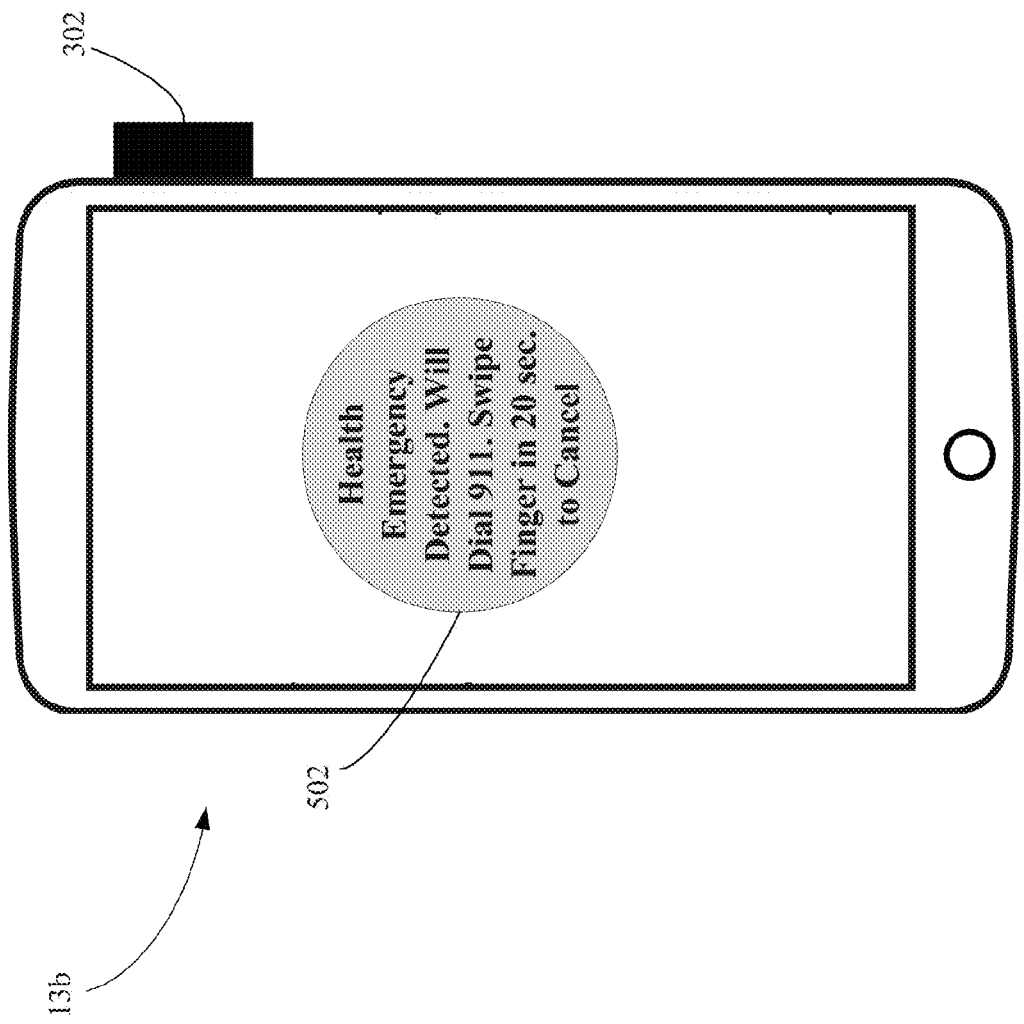
FIG. 5 illustrates an exemplary screen of the mobile device of FIG. 3 having an alert icon indicative of a detection of a health emergency by an emergency application.

At Step 910, the processor is configured to display a user interface on the display screen of the computing device, as shown in FIG. 5, which includes an icon 502 that includes a statement informing him/her that a health emergency has been detected, that the computing device will dial an appropriate emergency phone number associated with a medical hotline, and that the user may cancel a dialing of the emergency number by swiping his/her finger on the touch screen with a predetermined timeslot, such as twenty seconds for example. Alternatively, the processor may inform the user that a health emergency has been detected via a pre-recorded voice message on the computing device.

If the processor detects a swiping on the touch screen within that predetermined timeslot or detects a vocal statement instructing the processor to not proceed with the dialing of the emergency phone number, at Step 912, the processor is configured to cancel the dialing, at Step 914. Otherwise, the processor will proceed with the dialing of the emergency number and with the uploading of the collected data, at Step 916.

Once the collected data is received, an emergency operator may proceed to identify one or more potential assisting persons that are in position to render assistance to the user. As stated above, the potential assisting persons, such as EMTs, may be identified based at least in part on their respective proximity to the user, for example based on their respective interaction with the same cell of a cellular communications network, or based on their respective geographical location. Once identified, the emergency operator may select and send an electronic message to one of the identified potential assisting persons indicating that the user needs assistance. The electronic message may contain necessary medical and location information about the user to assist him in person. In this way, the user may be assisted in a desirable and quick manner. Moreover, the emergency operator may also inform the user via a text message, for example, that the selected assisting person is on his/her way to meet with the user so as to assist him/her medically in person. The text message may also include contact credentials of the selected assisting person, such as his/her name and a phone number of his/her mobile device.

Alternatively, once the collected data is received, an emergency operator may proceed to identify one or more potential assisting persons that are in position to render assistance to the user. As stated above, the potential assisting persons, such as EMTs, may be identified based at least in part on their respective proximity to the user, for example based on their respective interaction with the same cell of a cellular communications network, or based on their respective geographical location. Once identified, the emergency operator proceeds to send the user via a text message contact credentials, such as their names and phone numbers of their mobile devices, and assisting qualifications of the identified assisting persons. Once the contact credentials are received, the emergency application 35 is configured to automatically select one of the identified assisting persons based on a matching process of the user's current wellness credentials and the assisting qualifications of the assisting persons, and send the selected assisting person an electronic message that contains necessary medical and location information about the user to assist him in person. Once the selected assisting person meets in person with the assistance needing user, he/she may want to obtain necessary current health data of the assistance needing user. In response to a request, provided via a near field communication (NFC) from the mobile device of the selected assisting person, for such data from the selected assisting person, the user may provide his/her current wellness credentials via the NFC from his/her computing device. As such, the computing device of the user and the mobile device of the selected assisting person may include NFC devices, which when brought into contact with or in close proximity establish a radio communication between the mobile device and the computing device to transmit/share automatically the user's current wellness credentials and medical history. In one implementation, prior to sharing the user's current wellness credentials and medical history, the computing device of the user is configured to use the received contact credentials of the assisting person to determine whether to share the user's current wellness credentials and medical history. In one implementation, the mobile device of the selected assisting person is configured to compare the originally sent wellness credentials and the current wellness credentials to determine whether the health status of the user has remained the same or has changed positively or negatively. In one implementation, the communication between the mobile device and the computing device may be performed through a remote system.

Alternatively, the user may provide his/her current wellness credentials and medical history via an NFC tag or a radio frequency identification (RFID) tag worn by the user, which may be passive or active tags. The user's tag, which may be an unpowered chip, may have been programmed to collect the user's current wellness credentials and medical history from the computing device storage element, such as a memory, and share them with the mobile device when brought close to the tag.

In one example, the user's computing device may include an NFC-based application, which when launched by the user, is configured to generate and send a textual message via an NFC connection to the mobile device of the assisting person asking him/her to share his/her credentials by texting them or by scanning them on the computing device so that the computing device will upload the stored wellness credentials and medical history. Upon receipt or capture via the NFC connection of the assisting person credentials, the NFC-based application is configured to compare these credentials with the ones received from the emergency operator, and upon determination of a credential match to send the user's wellness credentials and medical history to the mobile device.

Figure 6:
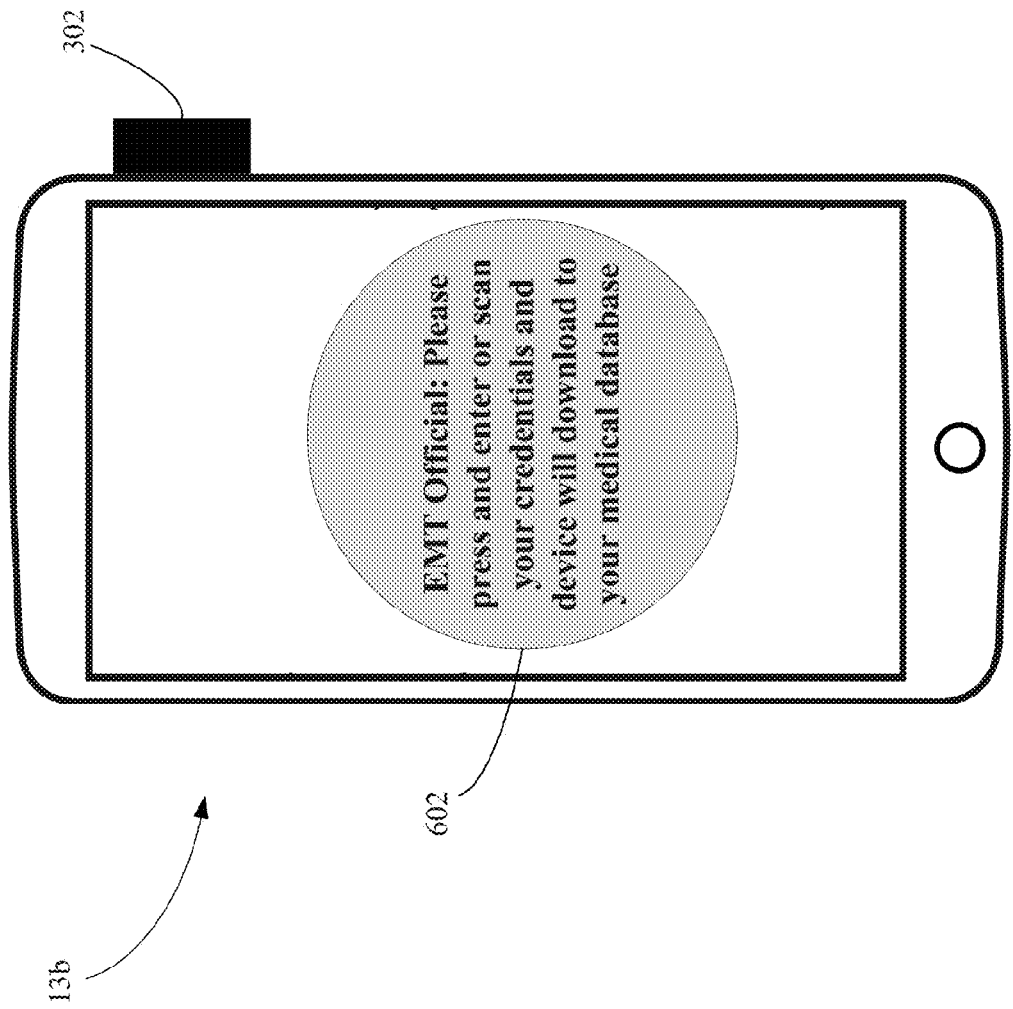
FIG. 6 illustrates an exemplary screen of the mobile device of FIG. 3 having an text message to be communicated to an emergency medical technician and that includes a request asking him/her to provide his/her credentials.

In another example, the NFC-based application may be configured to display a user interface, as shown in FIG. 6, which includes an icon 602 that includes a statement asking the assisting person to press on the icon 602 and enter or scan his/her credentials so that the computing device uploads the user's wellness credentials and medical history to the mobile device and/or to a medical database of the emergency center. Upon receipt or capture via the NFC connection of the assisting person credentials, the NFC-based application is configured to compare these credentials with the ones received from the emergency operator, and upon determination of a credential match to send the user's wellness credentials and medical history to the mobile device and/or to the medical database.

Alternatively, the user's computing device and the mobile device of the assisting person may be within proximity of a WIFI application, which enables the user's computing device to capture of the credentials of the assisting person. As such, the emergency application 35 is configured to compare these captured credentials with the ones received from the emergency operator, and upon determination of a credential match to send the user's wellness credentials and medical history to the mobile device and/or to the medical database.

Those skilled in the art presumably are familiar with the structure, programming and operations of the various types of mobile stations. However, for completeness, it may be useful to consider the functional elements/aspects of two exemplary mobile stations 13a and 13b, at a high-level.

As stated above, the emergency application may be downloaded from a mobile service carrier to the computing device. FIG. 10A provides a block diagram illustration of an exemplary non-touch type mobile station 13a. Although the mobile station 13a may be a smart-phone or may be incorporated into another device, such as a personal digital assistant (PDA) or the like, for discussion purposes, the illustration shows the mobile station 13a is in the form of a handset. The handset example of the mobile station 13a functions as a normal digital wireless telephone station. For that function, the station 13a includes a microphone 102 for audio signal input and a speaker 1104 for audio signal output. The microphone 1102 and speaker 1104 connect to voice coding and decoding circuitry (vocoder) 1106. For a voice telephone call, for example, the vocoder 1106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 1108. Today, the handset 13a would be configured for digital wireless communications using one or more of the common network technology types. The concepts discussed here encompass examples of the mobile station 13a utilizing any digital transceivers that conform to current or future developed digital wireless communication standards. The mobile station 13a may also be capable of analog operation via a legacy network technology.

The transceiver 1108 provides two-way wireless communication of information, such as vocoded speech samples and/or digital information, in accordance with the technology of the network 15. The transceiver 1108 also sends and receives a variety of signaling messages in support of the various voice and data services provided via the mobile station 13a and the communication network. Each transceiver 1108 connects through RF send and receives amplifiers (not separately shown) to an antenna 1110. The transceiver may also support various types of mobile messaging services, such as short message service (SMS), enhanced messaging service (EMS) and/or multimedia messaging service (MMS).

The mobile station 13a includes a display 1118 for displaying messages, menus or the like, call related information dialed by the user, calling party numbers, etc. A keypad 1120 enables dialing digits for voice and/or data calls as well as generating selection inputs, for example, as may be keyed-in by the user based on a displayed menu or as a cursor control and selection of a highlighted item on a displayed screen. The display 1118 and keypad 1120 are the physical elements providing a textual or graphical user interface. Various combinations of the keypad 1120, display 1118, microphone 1102 and speaker 1104 may be used as the physical input output elements of the graphical user interface (GUI), for identifying and communicating personalized emergencies. Of course other user interface elements may be used, such as a trackball, as in some types of PDAs or smart phones.

A microprocessor 1112 serves as a programmable controller for the mobile station 13*a*, in that it controls all operations of the mobile station 13*a* in accord with programming that it executes, for all normal operations, and for operations involved in the identification and communication of personalized emergencies procedure under consideration here. In the example, the mobile station 13*a* includes flash type program memory 1114, for storage of various "software" or "firmware" program routines and mobile configuration settings, such as mobile directory number (MDN) and/or mobile identification number (MIN), etc. The mobile station 13*a* may also include a non-volatile random access memory (RAM) 1116 for a working data processing memory. Of course, other storage devices or configurations may be added to or substituted for those in the example. In a present implementation, the flash type program memory 1114 stores firmware such as a boot routine, device driver software, an operating system, call processing software and vocoder control software, and any of a wide variety of other applications, such as client browser software and short message service software. As shown, the flash type program memory 1114 includes the clip generating application 1117. The memories 1114, 1116 also store various data, such as telephone numbers and server addresses, downloaded data such as multimedia content, and various data input by the user. Programming stored in the flash type program memory 1114, sometimes referred to as "firmware," is loaded into and executed by the microprocessor 1112.

As outlined above, the mobile station 13*a* includes a processor, and programming stored in the flash memory 1114 configures the processor so that the mobile station is capable of performing various desired functions, including in this case the functions involved in the technique for identifying and communicating personalized emergencies.

Figure 10B:
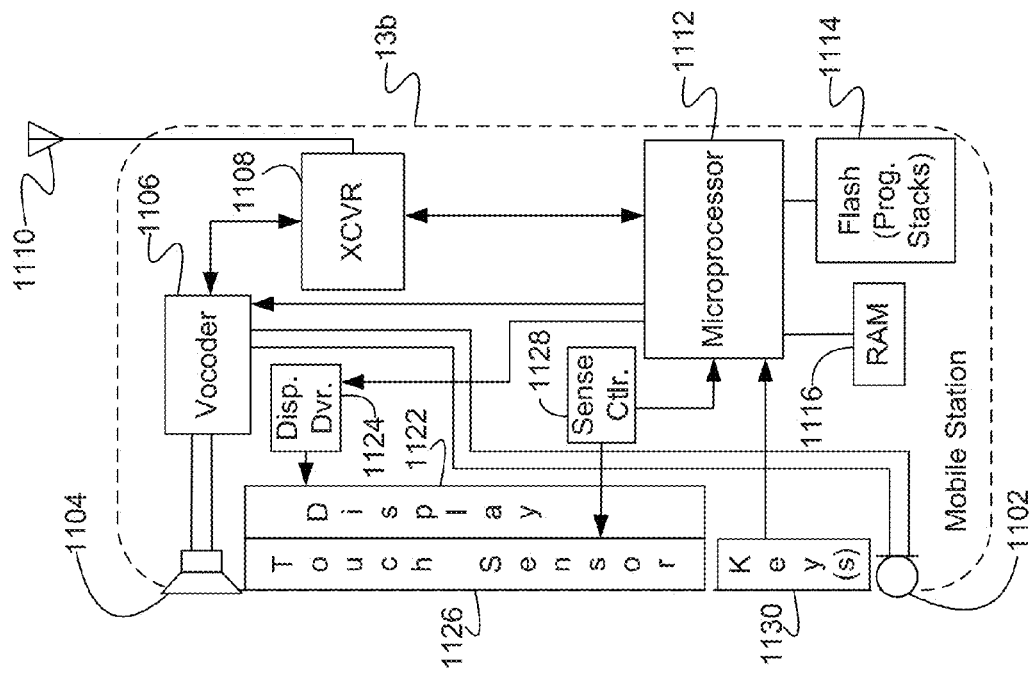
FIG. 10B is a high-level functional block diagram of an exemplary touch screen type mobile station used to identify and communicate a personalized emergency.
Figure 10A:
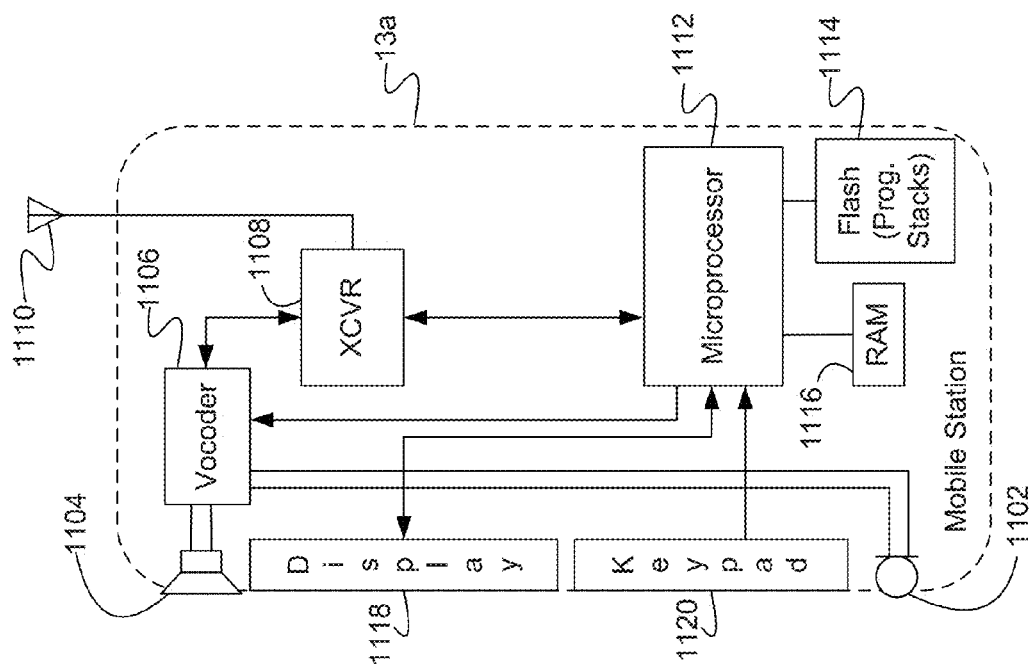
FIG. 10A is a high-level functional block diagram of an exemplary non-touch type mobile station used to identify and communicate a personalized emergency.

For purposes of such a discussion, FIG. 10B provides a block diagram illustration of an exemplary touch screen type mobile station 13*b*. Although possible configured somewhat differently, at least logically, a number of the elements of the exemplary touch screen type mobile station 13*b* are similar to the elements of mobile station 13*a*, and are identified by like reference numbers in FIG. 10A. For example, the touch screen type mobile station 13*b* includes a microphone 1102, speaker 1104 and vocoder 1106, for audio input and output functions, much like in the earlier example. The mobile station 13*b* also includes at least one digital transceiver (XCVR) 1108, for digital wireless communications, although the handset 13*b* may include an additional digital or analog transceiver. The concepts discussed here encompass examples of the mobile station 13*b* utilizing any digital transceivers that conform to current or future developed digital wireless communication standards. As in the station 13*a*, the transceiver 108 provides two-way wireless communication of information, such as vocoded speech samples and/or digital information, in accordance with the technology of the network 15. The transceiver 1108 also sends and receives a variety of signaling messages in support of the various voice and data services provided via the mobile station 13*b* and the communication network. Each transceiver 1108 connects through RF send and receive amplifiers (not separately shown) to an antenna 1110. The transceiver may also support various types of mobile messaging services, such as short message service (SMS), enhanced messaging service (EMS) and/or multimedia messaging service (MMS).

As in the example of station 13*a*, a microprocessor 1112 serves as a programmable controller for the mobile station 13*b*, in that it controls all operations of the mobile station 13*b* in accord with programming that it executes, for all normal operations, and for operations involved in the identifying and communicating personalized emergencies procedure under consideration here. In the example, the mobile station 13*b* includes flash type program memory 1114, for storage of various program routines and mobile configuration settings. As shown, the flash type program memory 1114 includes the clip generating application 1117. The mobile station 13*b* may also include a non-volatile random access memory (RAM) 1116 for a working data processing memory. Of course, other storage devices or configurations may be added to or substituted for those in the example. Hence, outlined above, the mobile station 13*b* includes a processor, and programming stored in the flash memory 1114 configures the processor so that the mobile station is capable of performing various desired functions, including in this case the functions involved in the technique for personalized emergency identification and communication.

In the example of FIG. 10A, the user interface elements included a display and a keypad. The mobile station 13*b* may have a limited number of key 1130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13*b* includes a display 1122, which the microprocessor 1112 controls via a display driver 1124, to present visible outputs to the device user. The mobile station 13*b* also includes a touch/position sensor 1126. The sensor 1126 is relatively transparent, so that the user may view the information presented on the display 122. A sense circuit 1128 sensing signals from elements of the touch/position sensor 1126 and detects occurrence and position of each touch of the screen formed by the display 1122 and sensor 1126. The sense circuit 1128 provides touch position information to the microprocessor 1112, which can correlate that information to the information currently displayed via the display 1122, to determine the nature of user input via the screen.

The display 1122 and touch sensor 1126 (and possibly one or more keys 1130, if included) are the physical elements providing the textual and graphical user interface for the mobile station 13*b*. The microphone 1102 may be used as an additional user interface element, for audio input, with respect to personalized emergency identification and communication. The structure and operation of the mobile stations 13*a* and 13*b*, as outlined above, were described to by way of example, only.

FIG. 11A depicts a computer with user interface elements, as may be used to implement a personal computer or other type of work station or terminal device, although the computer of FIG. 11A may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 11A). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the processes/methods of identifying and communicating personalized emergencies outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the emergency application into the computer platform of the mobile stations 13a and 13b. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the emergency application. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Figure 12:
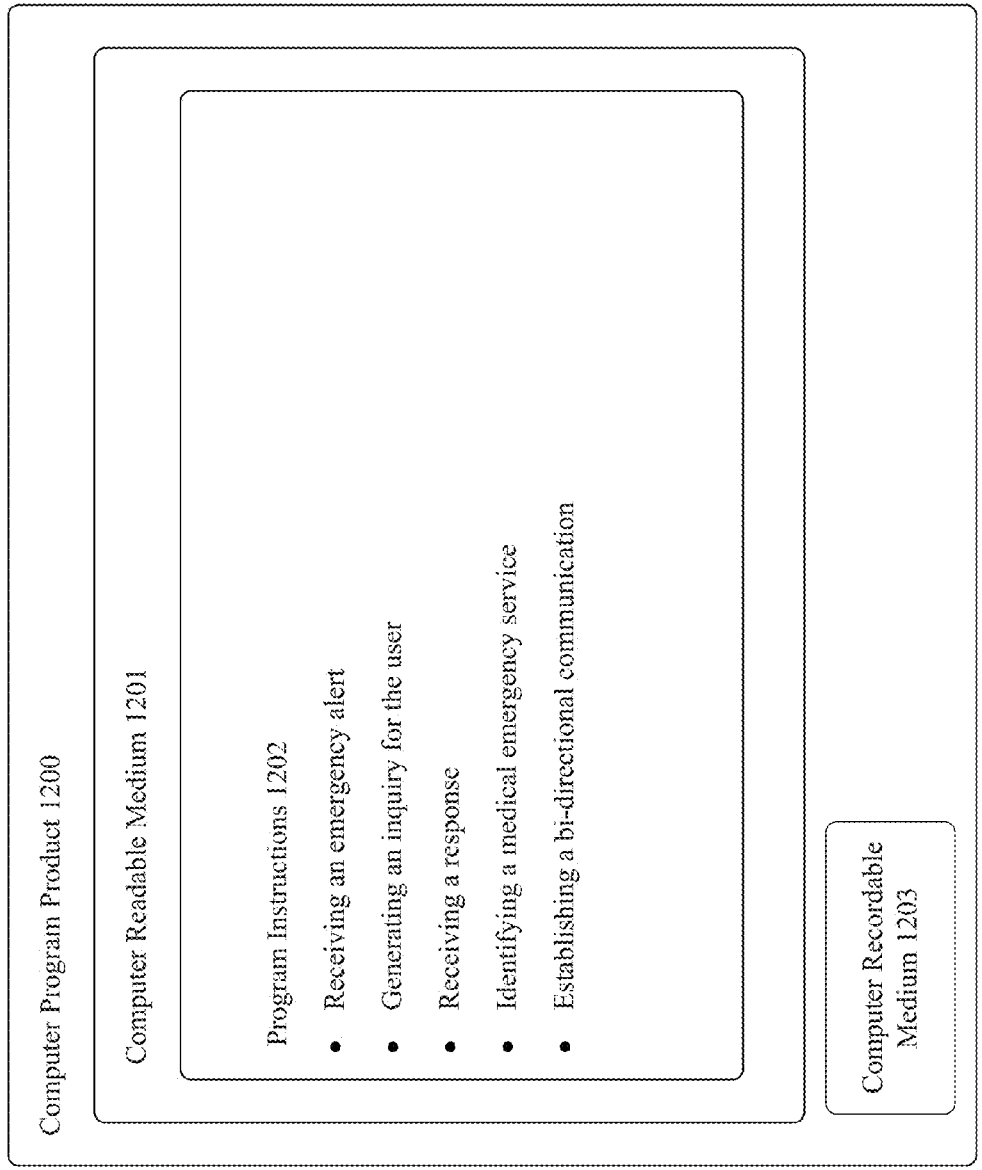
FIG. 12 is a schematic diagram illustrating a conceptual partial view of an example computer program product.

In some examples, the discussed methods may be implemented as computer program instructions encoded on a computer-readable storage media in a machine-readable format. FIG. 12 is a schematic diagram illustrating a conceptual partial view of an example computer program product 1200 that includes a computer program for executing a computer process on a computing device, arranged according to at least some examples presented herein. The example computer program product 1200 may be provided using a non-transitory computer readable medium 1201. The non-transitory computer readable medium 1201 may include one or more programming instructions 1202 that, when executed by one or more processors may provide functionality or portions of the functionality described above with respect to FIGS. 2-11. Thus, for example, referring to the example shown in FIGS. 9 and 10, one or more features of blocks 202, 204, 206, 208, 210, 212, 214, and/or 216, one or more features of blocks 802, 804, 806, 808, 810, 812, 814, and/or 816, and one or more features of blocks 902, 904, 906, 908, 910, 912, 914, 916, and/or 918 may be undertaken by one or more instructions associated with the non-transitory computer readable medium 1301.

In some implementations, the non-transitory computer readable medium 1201 may encompass a computer recordable medium 1203, such as, but not limited to, memory, read/write (R/W) CDs, R/W DVDs, etc. The one or more programming instructions 1202 may be, for example, computer executable and/or logic implemented instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method comprising:
    receiving via a processor of a computing device an emergency alert;
    generating via the processor and providing to a user of the computing device an inquiry as to whether the received emergency alert relates to a medical emergency or to a non-medical emergency of the user;
    receiving a response from the user indicating that the emergency alert relates to the medical emergency;
    responsive to the indication that the emergency alert relates to the medical emergency, retrieving from a memory of the computing device a medical history of the user and identifying a geographical location of the user;
    identifying a medical emergency service suitable for a type of medical assistance required by the user based on the received response and the retrieved medical history; and
    establishing a bi-directional communication between the computing device and a communication device of the identified medical emergency service to upload to a data storage element of the communication device the medical history and geographical location of the user.

2. The method of claim 1, wherein the emergency alert is triggered by at least one of:
    dialing of an emergency phone number on the computing device, or
    launching of an emergency application loaded on the computing device.

3. The method of claim 1, wherein providing the inquiry includes:
    displaying the inquiry on a first user interface on a display screen of the computing device, or
    announcing vocally the inquiry via a speaker of the computing device.

4. The method of claim 2, wherein the launching of the emergency application is triggered by at least one of: one of a voice command input, selecting an icon displayed on a display screen of the computing device, swiping of a finger on the display screen of the computing device, or a predetermined shaking or flipping of the computing device.

5. The method of claim 1, further comprising identifying one or more medical emergency assisting persons that are in position to provide medical assistance to the user, wherein the medical emergency assisting persons are identified based at least in part on their respective geographical proximity to the user or based on their respective interaction with the same cell of a cellular communications network connected to the computing device.

6. The method of claim 5, further comprising:
    selecting one of the identified medical emergency assisting persons to medically assist the user;
    sending a first electronic message to a mobile device of the selected medical emergency assisting person, which includes geographical location of the user and information about the life threatening situation of the user; and
    sending to the computing device a second electronic message that includes contact information of a mobile device and credentials of the selected medical emergency assisting person selected by an operator of the life assisting service to assist the user.

7. The method of claim 6, further comprising:
    determining that the selected medical emergency assisting person has reached the geographical location of the user; and
    sending to the mobile device current wellness data of the user captured by a controller in communication with one or more sensors monitoring physiological credentials of the user.

8. The method of claim 1, further comprising:
    determining that the received response indicates that the emergency alert relates to a non-medical emergency;
    generating via the processor and providing to a user of the computing device an additional inquiry as to whether the received emergency alert relates to a current life threatening situation of the user;
    receiving an additional response from the user indicating that the emergency alert relates to the current life threatening situation; and
    identifying a life assisting service to establish a unidirectional silent alert communication with the computing device to provide access to an on-going or near-future conversation conducted by an offender with the user or around the user so as to assess the situation and proceed with a suitable action that would provide assistance to the user.

9. The method of claim 8, wherein:
the suitable action involves identifying one or more potential assisting persons that are in position to render assistance to the user; and
the one or more potential assisting persons are identified based at least in part on their respective geographical proximity to the user and based on their respective interaction with the same cell of a cellular communications network.

10. The method of claim 9, further comprising:
selecting one of the identified potential assisting persons; and
sending an electronic message to the selected assisting person, which includes geographical location of the user and information about the life threatening situation of the user.

11. A mobile device comprising:
a display screen;
a processor operatively coupled to the display screen;
a memory unit for storing program instructions executable by the processor to cause the mobile device to perform a method, the method comprising:
receiving via a processor of a computing device an emergency alert;
generating via the processor and providing to a user of the computing device an inquiry as to whether the received emergency alert relates to a medical emergency or to a non-medical emergency of the user;
receiving a response from the user indicating that the emergency alert relates to the medical emergency;
responsive to the indication that the emergency alter relates to the medical emergency, retrieving from a memory of the computing device a medical history of the user and identifying a geographical location of the user;
identifying a medical emergency service suitable for a type of medical assistance required by the user based on the received confirmation and the retrieved medical history; and
establishing a bi-directional communication between the computing device and a communication device of the identified medical emergency service to upload to a data storage of the communication device the medical history and geographical location of the user.

12. The mobile device of claim 11, wherein the emergency alert is triggered by at least one of:
a dialing of an emergency phone number on the computing device, or
launching an emergency application loaded on the computing device.

13. The method of claim 11, wherein the inquiry includes at least one of:
displaying the inquiry on a first user interface on a display screen of the computing device, or announcing vocally the inquiry via a speaker of the mobile device.

14. The method of claim 12, wherein the launching of the emergency application is triggered by at least one of: a voice command input, selecting an icon displayed on a display screen of the computing device, swiping of a finger on the display screen of the computing device, or a predetermined shaking or flipping of the computing device.

15. The method of claim 11, further comprising:
identifying one or more medical emergency assisting persons that are in position to provide medical assistance to the user, wherein the medical emergency assisting persons are identified based at least in part on their respective geographical proximity to the user and based on their respective interaction with the a cell of a cellular communications network connected to the computing device.

16. The method of claim 15, further comprising:
selecting one of the identified medical emergency assisting persons to medically assist the user;
sending a first electronic message to a mobile device of the selected medical emergency assisting person, which includes geographical location of the user and information about the medical emergency of the user; and
sending to the computing device a second electronic message that includes contact information of a mobile device and credentials of the selected medical emergency assisting person selected by an operator of the life assisting service to assist the user.

17. The method of claim 16, further comprising:
determining that the selected medical emergency assisting person has reached the geographical location of the user; and
sending to the mobile device current wellness data of the user captured by a controller in communication with one or more sensors monitoring physiological credentials of the user.

18. The method of claim 11, further comprising:
determining that the received response indicates that the emergency alert relates to a non-medical emergency;
generating via the processor and providing to the user of the computing device an additional inquiry as to whether the received emergency alert relates to a current life threatening situation of the user;
receiving an additional response from the user indicating that the emergency alert relates to the current life threatening situation; and
identifying a life assisting service to establish a unidirectional or bi-directional silent alert communication with the computing device to provide access to an on-going or near-future conversation conducted by an offender with the user or around the user so as to assess the current life threatening situation and proceed with a suitable action that would provide assistance to the user.

* * * * *